May 3, 1927.
E. G. GOODWIN
SIDE BEARING
Filed Feb. 18. 1924
1,627,432
3 Sheets-Sheet 1
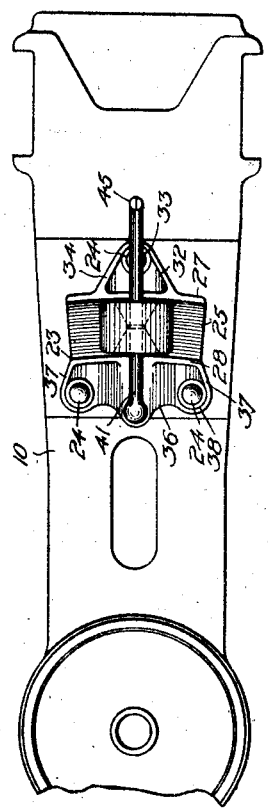
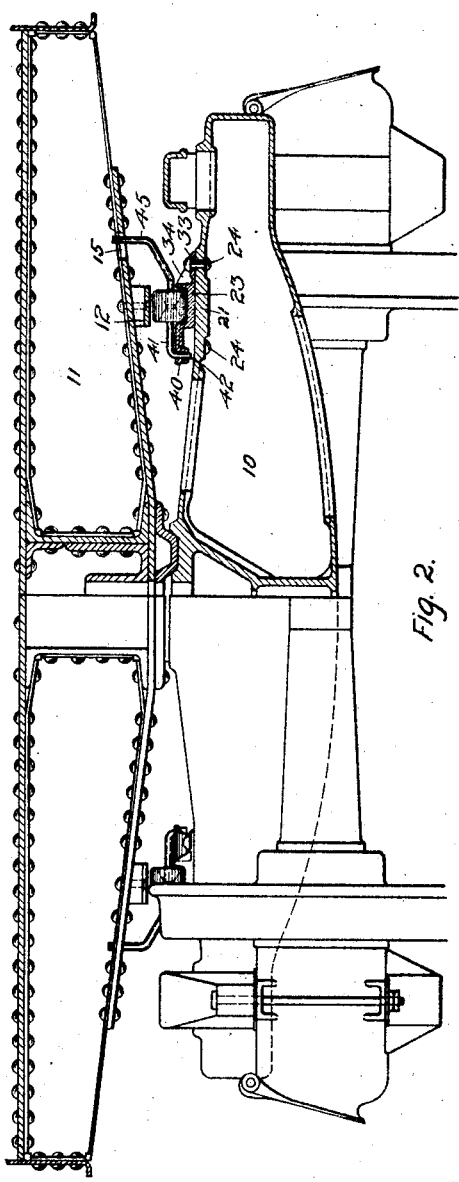
INVENTOR
E. G. GOODWIN
BY Church & Church
ATTORNEYS May 3, 1927.
E. G. GOODWIN
SIDE BEARING
Filed Feb. 18. 1924
1,627,432
3 Sheets-Sheet 2
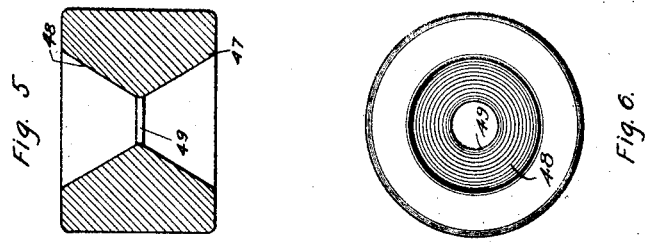
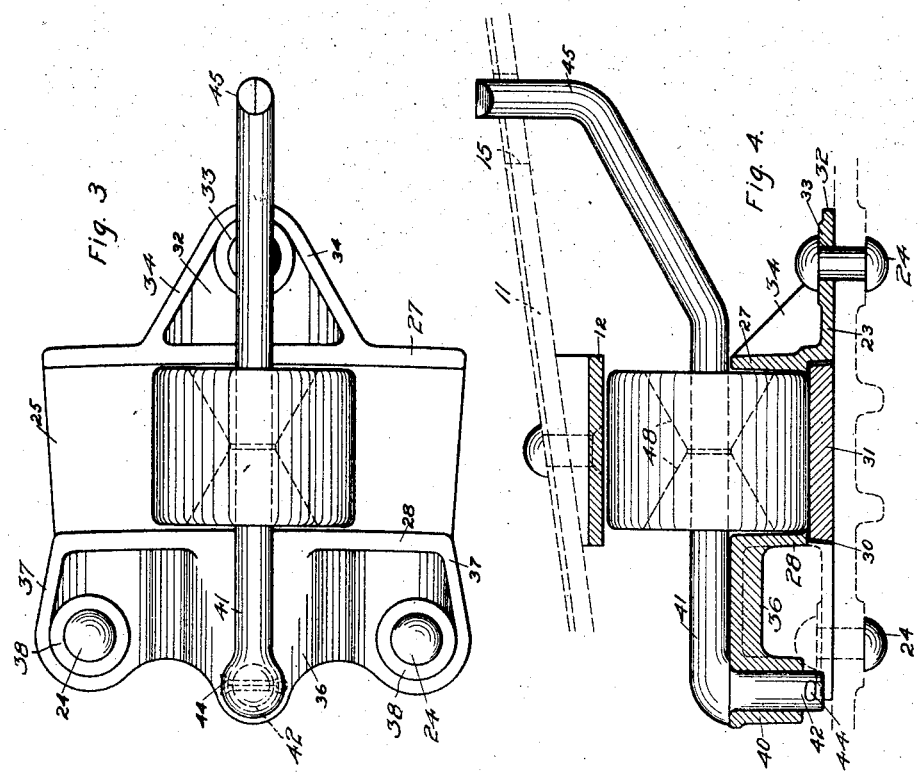
INVENTOR
E. G. GOODWIN
BY Church & Church
ATTORNEYS May 3, 1927.

E. G. GOODWIN 1,627,432

SIDE BEARING

Filed Feb. 18. 1924

INVENTOR
E.G. GOODWIN.
BY Church & Church
ATTORNEYS

Patented May 3, 1927.

1,627,432

UNITED STATES PATENT OFFICE.

ERNEST G. GOODWIN, OF NEW YORK, N. Y., ASSIGNOR, BY MESNE ASSIGNMENTS, TO GOODWIN SIDE BEARING CO., INC., OF WILMINGTON, DELAWARE, A CORPORATION OF DELAWARE.

SIDE BEARING.

Application filed February 18, 1924. Serial No. 693,712.

This invention relates to side bearings for railway cars, and has for its object the provision of an improved bearing that will be simple in construction and yet more efficient than the bearings now in use.

Railway cars are commonly provided with side bearings which are usually gravity or spring-centered, so that in normal operation, since the car does not ordinarily rest on the side bearing, the bearings remain in their mid-position when the car goes on a curve, unless the bearings are loaded and even in this case they return to mid-position immediately upon removal of the load. As the result of this, when a car, turning a curve in one direction, settles on one of the side bearings and then turns a curve in the opposite direction while still settled on the first bearing requires the total travel of the bearing while but one-half of such travel is available.

In the present invention, the roller is positioned by a rod of such length as to position the roller at all times in exactly the same place as if it were constantly loaded, and consequently the entire travel of the device is available at all times. The positioning rod does not in any way hinder the travel of the roller when engaged by the upper bearing, since both the load and the positioning rod each tend to move the roller in the same direction and at the same rate.

In the drawings,—

Figure 1 is a top plan view of the housing, rod, and rollers.

Fig. 2 is a rear elevation showing in addition to the parts illustrated in Fig. 1, the body bolster and the wear plate.

Fig. 3 is a view generally similar to that of Fig. 1 but on a larger scale.

Fig. 4 is a side elevation of the parts shown in Fig. 2.

Figs. 5 and 6 are, respectively, a vertical cross section and an elevation of the roller.

Figure 7:
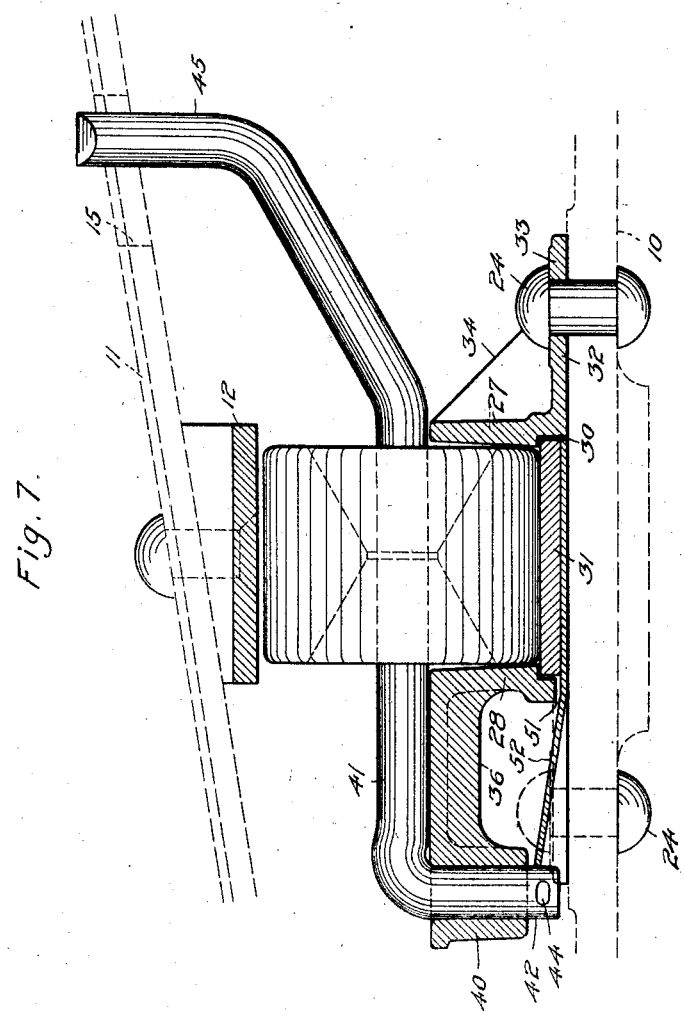
Fig. 7 shows a modification which may be considered the preferred type.

The truck bolster 10 and the body bolster 11 are of usual type, the latter carrying a wear plate 12 which may be either arcuate or rectangular but is preferably rectangular as shown, the width of the wear plate being sufficiently larger than the face of the roller to allow for the arcuate movement of the roller. The body bolster 11 is slotted at its outer or front end as at 15 and at its center is provided with the usual connection with the truck bolster.

The lower or truck bolster 10 is thickened as at 21 to afford a more firm support for the housing 23 preferably secured to the truck bolster by three bolts 24 as shown. The housing has a generally channel-shaped path for the roller consisting of a flat bottom 25 and the front and rear sides 27 and 28, respectively, the bottom 25 being either solid or preferably with a square cut-out portion 30 to receive a roller seat 31 which then may be of relatively thin, say about half an inch, hardened spring steel, the housing preferably being of malleable iron.

The front of the channel, a centrally extending triangular lug 32, is thickened at the apex to form the front bolt socket 33 and is supported and stiffened by the sloping ribs 34. The rear plate 36 is likewise stiffened at its sides by triangular ribs 37 sloping down to the rear bolt sockets 38 and in the center portion the rear plate 36 is bulged upwardly to the level of the top of the rear side 28 of the channel and at this point carries a downwardly extending sleeve 40 forming the pivotal support of the positioning rod 41 which at its reduced rear end 42 is preferably perforated to receive a cotter pin 44. The reducing of the diameter of the positioning rod furnishes a shoulder which rests on the smooth upper surface of the rear plate 36 and holds the rod out of contact with the remainder of the housing. Just beyond the housing the rod is bent upwardly and finally vertically as at 45 forming a guiding end which extends through the slot 15 in the body bolster 11.

The roller is preferably of high carbon steel and preferably is cylindrical in form very slightly bulged at the sides as at 47 and having its central bore formed by two opposed cones 48 preferably with their meeting circle removed to form a slight cylindrical surface 49 to engage the positioning rod. The vertex angle of each cone is determined by the extreme travel of the roller and is such that when the roller is at either limit of its travel the rod is in contact with the side of one or both of the cones.

In order that the roller shall move when not loaded exactly the same as when the bearing is loaded the distance between the axis of the sleeve 40 and the vertical end of the positioning rod is calculated with that end in view, for example, where the bearing is placed with the center line 27 inches from the center line of the car the distance between the center of the roller and the pivot 40 should be five and three-eighths inches if the distance between the vertical end of the positioning rod and the center of the roller is nine inches. The particular shape of the roller is necessary as stated to take care of the angularity of the positioning rod but at the same time it does not materially weaken the roller.

The positioning rod acts as a retainer for the roller and makes the use of trunnions unnecessary. All friction is avoided for the reason that the load always comes on the periphery of the roller at both the top and the bottom and hence the friction always present when rollers are supported on trunnions and where they come in contact with the end walls of the runway, is entirely avoided.

It will be seen from the drawings that the body bolster 11 may be removed from the truck bolster 10 without interference of any kind from the positioning rod and that when the body bolster is so removed there is no danger of losing the roller as it is held in the channel of the housing by the cotter pin 44. The roller may readily be slipped from the rod when the car body is removed by first knocking out the cotter pin 44 and lifting the roller and rod from the housing. But, in order that there shall be no danger of losing the rollers when the truck is being handled by a crane or otherwise, the device is purposely so designed that with the cotter pin in position the roller will bind on the positioning rod before the roller reaches the limit of its travel in the channel, the channel being extended slightly beyond that otherwise necessary, for this purpose.

In Fig. 7 I have shown a type of side bearing which I prefer for the reason that by its use I can produce the amount of clearance necessary since this modification enables the roller being raised into contact with the wear plate on the body bolster. The housing is slotted as at 51 to allow entry of a thin piece of metal such as 52 forming a shim between the truck bolster and the roller seat. By providing shims of different thicknesses the height of the top of the roller can be brought into exact registry with the bottom of the wear plate and in this way the necessary tolerance can be greatly reduced. There is no danger of the shim working out as, after the shim of approximate thickness has been inserted, the free end of the shim is bent upwardly so that it engages the portion of the positioning rod which lies beneath the sleeve 40 and accidental removal of the shim is therefore impossible while at the same time it is a relatively simple matter to remove the shim while holding it bent into alinement with the portion of the shim under the bearing plate.

While I have shown my device in its preferred form I do not wish to be unduly restricted by the illustration. For example, the pivotal connection of the positioning rod may be to the housing or to the body bolster and the slot likewise may be in either of the two bolsters and either end of the positioning rod may be the sliding pivot. For convenience the form shown is much preferred.

What I claim is:

1. A roller side bearing for cars of the type employing a roller positioned between the body bolster and the truck bolster, characterized by the provision of a rod passing thru the roller to position it, said rod having two parallel ends, one of which pivots the rod to one of said bolsters and the other of which is guided by the bolster, said ends lying on opposite sides of the roller and at right angles to its axis.

2. A roller side bearing for cars of the type employing a roller positioned between the body bolster and the truck bolster, characterized by the provision of a channel member forming a runway for the single cylindrical roller, and walls on the sides of said member curved on an arc having a radius substantially equal to twice the distance from the pivot of the truck to said wall, whereby end thrust of the roller is minimized.

3. A roller side bearing for cars of the type employing a roller positioned between the body bolster and the truck bolster, characterized by the roller being cylindrical, and by the provision of an open ended channel member forming a runway for the single cylindrical roller, and walls on the sides of said member curved on an arc having a radius substantially equal to twice the distance from the pivot of the truck to said wall, whereby end thrust of the roller is minimized.

4. In combination, a pair of pivoted car bolsters, one of them slotted, a plane runway on the lower bolster and a plane bearing surface on the upper bolster, a single cylindrical roller between said runway and said bearing surface, curved roller guides for limiting the endwise movement of the roller, said guides being struck on a radius greater than the distance between the pivot of the bolsters and said guides, and a roller retaining and guiding member pivotally mounted in said slot and pivoted about an axis fixed with respect to the other bolster.

5. In combination, a pair of pivoted car bolsters, one of them slotted, a plane runway on the lower bolster and a plane bearing surface on the upper bolster, a single cylindrical roller between said runway and said bearing surface, means for limiting the endwise movement of the roller, and a roller retaining and guiding member pivotally mounted in said slot and pivoted about an axis fixed with respect to the other bolster said limiting means including a side wall for said plane runway curved on an arc having its radius substantially twice the distance from the bolster pivot to said side wall.

6. A housing for a roller side bearing comprising a bed having an opening therein, a wall for said bed having a slot therein alined with said opening and communicating therewith, a socket integral with said wall, and a member fitting in said slot and engaging said socket to lock same in place in said slot.

7. In a roller side bearing for railway cars, the combination of opposed bearing plates on the car and truck bolsters, a roller between said bearing plates, a rod for positioning said roller between the plates, and means between the truck bolster and the bearing plate on the truck bolster for varying the side bearing clearance to reduce rocking of the car to a minimum, said last mentioned means being held between said plate by the vertical end of said rod.

ERNEST G. GOODWIN.